Figure 1:
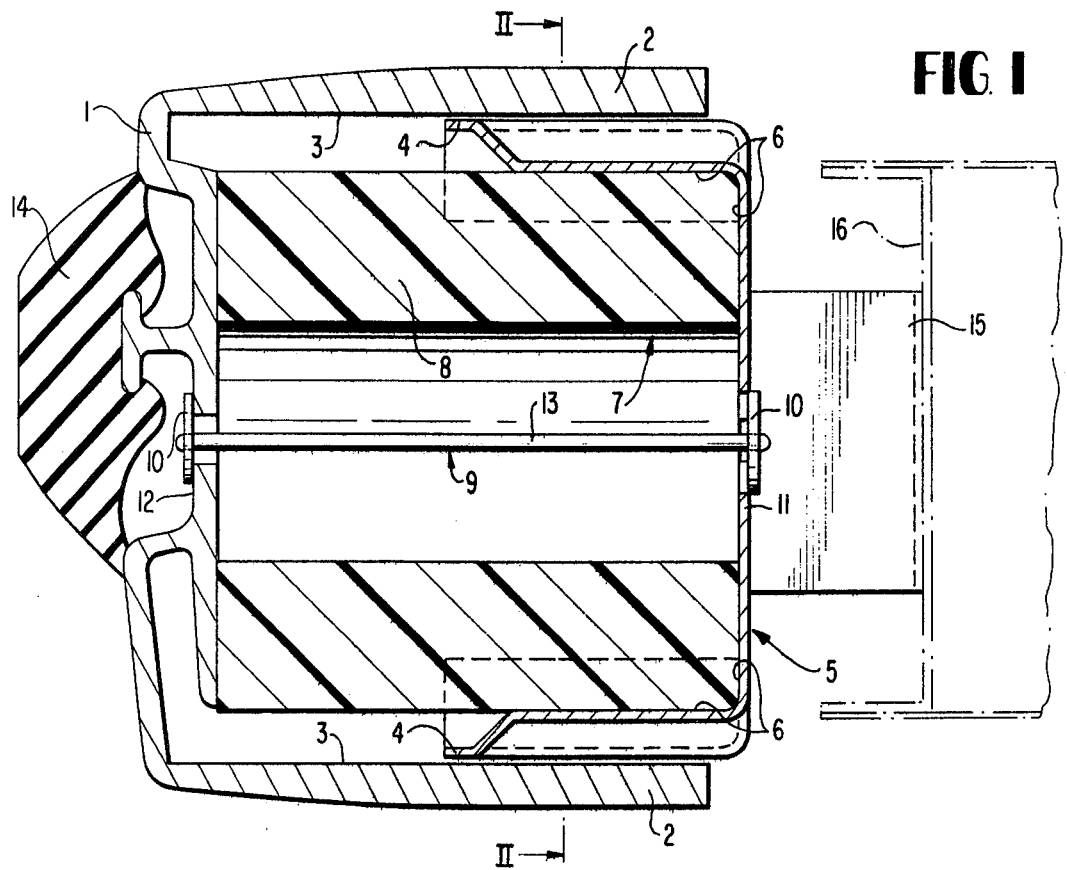

United States Patent [19]
Weisshappel et al.

[11] 4,085,956
[45] Apr. 25, 1978

[54] BUMPER CONSTRUCTED AS AN ELASTOMERIC HOLLOW SPRING

[75] Inventors: Helmut Weisshappel, Sindelfingen; Wolfgang Klie, Korntal; Wolfgang Fischer, Leinfelden, all of Germany

[73] Assignees: Daimler-Benz Aktiengesellschaft, Germany

[21] Appl. No.: 670,905

[22] Filed: Mar. 26, 1976

[30] Foreign Application Priority Data

Mar. 27, 1975 Germany .................................. 2513589

[51] Int. Cl.$^2$ .......................................... B60R 19/06
[52] U.S. Cl. .......................................................... 293/86
[58] Field of Search ................... 293/71 R, 88, 60, 66, 293/84, 85, 86; 267/140; 114/219

[56] References Cited

U.S. PATENT DOCUMENTS

| | | | |
|---|---|---|---|
| 1,602,922 | 10/1926 | Midboe | 293/71 R |
| 2,063,957 | 12/1936 | Short | 293/71 R |
| 2,263,599 | 11/1941 | Tucker | 293/71 R |
| 3,014,710 | 12/1961 | Layne | 114/219 |
| 3,339,907 | 9/1967 | Parker | 114/219 |
| 3,722,876 | 3/1973 | Schwenk | 293/71 R |

Primary Examiner—Trygve M. Blix
Assistant Examiner—Jesus D. Sotelo
Attorney, Agent, or Firm—Craig & Antonelli

[57] ABSTRACT

A shock-absorber constructed as elastomer hollow spring which is arranged between a vehicle bumper and a fixed vehicle part and which is supported thereat under prestress; the shock absorber at its end near the vehicle includes a frame-like enclosure whose inner area abuts at the shock absorber and whose outer area abuts at the inner sides of the sections of the bumper that are directed toward the vehicle.

17 Claims, 2 Drawing Figures

U.S. Patent    April 25, 1978    4,085,956

BUMPER CONSTRUCTED AS AN ELASTOMERIC HOLLOW SPRING

The present invention relates to a shock absorber constructed as elastomer hollow spring which is arranged between a vehicle bumper and a fixed vehicle part, for example, a cross bearer, and which is supported at these parts under prestress.

Such a shock-absorber arrangement which is disclosed in the German Offenlegungsschrift 2,131,054, is capable of absorbing impacts which are directed in the vehicle longitudinal direction and also obliquely thereto, up to a predetermined order of magnitude and to regenerate within a reasonable time. By reason of the fastening of the shock absorber under prestress, tensional forces engaging at the shock absorber can be absorbed in by-passing the elastomer hollow spring. However, it is disadvantageous with this prior art arrangement that forces acting on the shock absorber in the vertical direction, as occur, for example, when towing away the vehicle, cannot be supported in an aimed-at manner. It is also feasible that alone the weight of the bumper leads to a tipping down or tilting down after a certain period of time.

It is the aim of the present invention under preservation of the advantages of the prior art arrangement to provide a shock-absorber fastening under interposition of prestressed elastomer hollow springs which does not entail the described disadvantages.

Accordingly, a shock absorber constructed as elastomer hollow spring is proposed which is arranged between a vehicle bumper and a fixed vehicle part, for example, a cross bearer, and which is supported under prestress at these parts, whereby according to the present invention, the shock absorber includes at its end near the vehicle a frame-like enclosure whose inner area abuts at the shock absorber and whose outer area abuts at the inner sides of the section of the bumper directed inwardly of the vehicle.

In order that tolerances and surface inaccuracies at the inner sides of the projecting bumper sections can be compensated for in a simple manner, the frame may consist of spring steel.

A predetermined prestress can be applied without special tools if a tie-rod with plate-shaped end areas and with a center portion consisting preferably of a steel cable is provided, whose end areas are supported at the outer bottom surface of the frame-like enclosure and at the front face of the bumper. However, it would also be possible within the scope of the present invention to utilize a cable or wire of another material fulfilling the same purpose, in lieu of the steel cable.

A pleasing appearance is achieved if the plate-shaped end area of the tie rod is covered off at the front face of the bumper by a rubber bar.

Accordingly, it is an object of the present invention to provide a shock absorber of the type described above which avoids by simple means the aforementioned shortcomings and drawbacks encountered in the prior art.

Another object of the present invention resides in a bumper and shock absorber structure which permits a designed absorption also of forces acting thereon in the vehicle upright direction and which can be readily installed without special tools.

A further object of the present invention resides in a bumper-shock-absorber assembly in which tolerances and surface inaccuracies at the inner sides of projecting bumper sections can be readily compensated for.

Still another object of the presnt invention resides in a bumper-shock-absorber assembly which has a pleasing appearance to the observer when installed in the vehicle.

Figure 2:
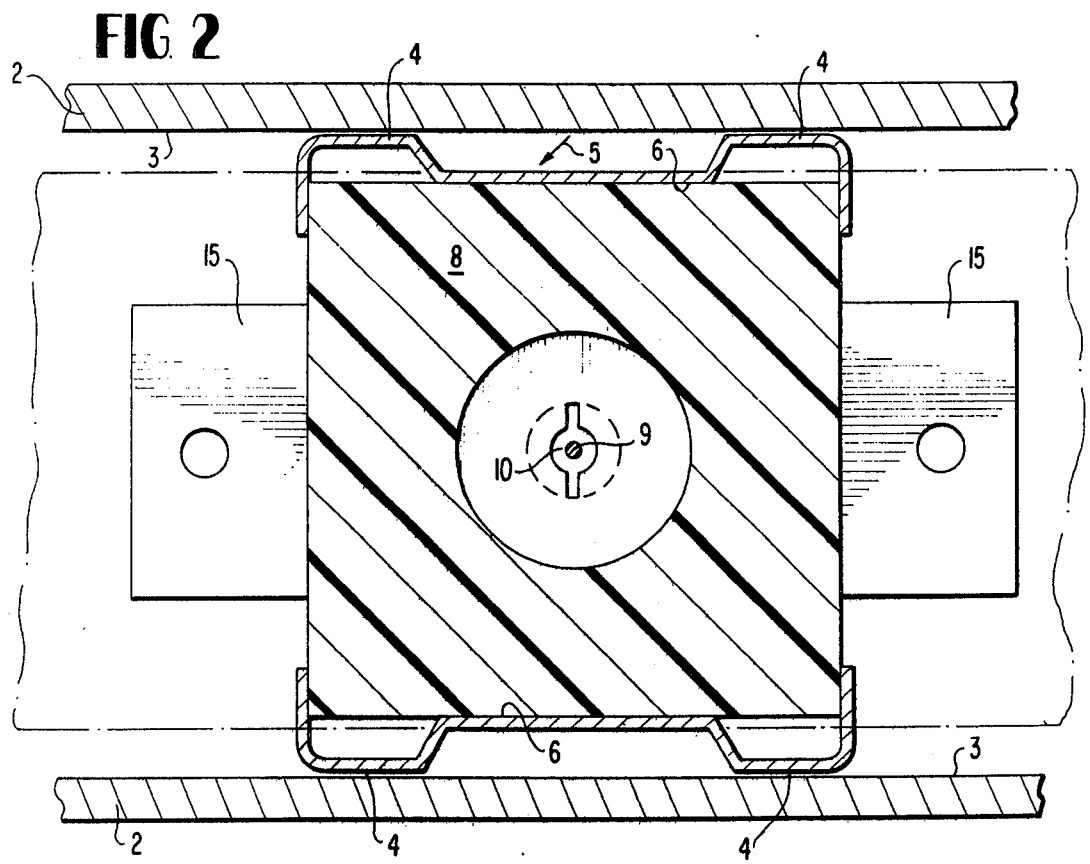

These and other objects, features and advantages of the present invention will become more apparent from the following description when taken in connection with the accompanying drawing which shows, for purposes of illustration only, one embodiment in accordance with the present invention and wherein:

FIG. 1 is a longitudinal cross-sectional view through an arrangement of a shock absorber for a bumper in accordance with the present invention; and FIG. 2 is a cross-sectional view taken along line II-II in FIG. 1.

Referring now to the drawing wherein like reference numerals are used throughout the two views to designate like parts, a bumper 1 consisting, for example, of an extruded profile, includes sections 2 directed inwardly of or toward the vehicle, at the inner side 3 of which abut outer areas 4 of a frame-like enclosure structure generally designated by reference numeral 5 made, for example, of spring-steel, which in the aforementioned areas may also be coated with a suitable synthetic resinous material. The inner area 6 of the frame-like enclosure 5 receives the end 7 near the vehicle of a shock absorber 8, which shock absorber is constructed as elastomer hollow spring and is prestressed by means of a cable forming a tie rod generally designated by reference numeral 9.

The tie rod 9 includes plate-shaped end areas 10 which are supported at the outer bottom surface 11 of the frame-like enclosure 5 and at the front face 12 of the bumper 1. The ends of the tie rod 9 may be suitably secured to the plate-shaped ends 10, for example, by being peened over or brazed thereto. A center part 13 of steel cable assumes the connection of the two end areas 10. For purposes of assembly, the bumper 1 and the shock-absorber 8 retained by the frame-like enclosure 5 are received by and mounted in a clamping device (not shown), by means of which an assembly prestress is applied which exceeds the prestress under normal operation. It is thus possible to extend the tie rod 9, for example, from the front end 12 by means of a suitable auxiliary means through a corresponding aperture in the bottom surface 11. By reason of the flexibility of the tie rod 9, the respective end area 10 can be tilted through 90° during the assembly in order to return again into its original position after the termination of the assembly owing to the return moment of the tie rod 9. After removal of the prestress applied by the clamping device, there then remains an accurately defined normal prestress.

For covering the end area 10 disposed at the front face 12 of bumper 1, a rubber bar 14 may be snapped on which simultaneously protects the bumper 1. This preassembled structural unit can be secured at a fixed vehicle part such as, for example, at a cross bearer 16 by means of brackets 15 projecting from the frame-like enclosure 5.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A shock absorber constructed as an elastomer hollow spring which is arranged between a vehicle bumper with sections directed toward the vehicle and a fixed vehicle part and which is supported thereat under prestress, characterized in that the shock absorber includes at its end near the vehicle a C-shaped frame-like means receiving said shock absorber and having an inner surface area abutting at the shock absorber and an outer surface area abutting at the inner sides of the sections of the bumper directed toward the vehicle, and wherein first means are provided for securing said frame-like means and said shock absorber to said bumper, and second means are provided for securing said frame-like means to said fixed vehicle part.

2. A shock absorber according to claim 1, characterized in that the fixed vehicle part is a cross bearer.

3. A shock absorber according to claim 1, characterized in that the frame-like means consists of spring steel.

4. A shock absorber according to claim 1, characterized in that for applying the prestress, a tie-rod means is provided having plate-shaped end areas and a center portion, the end areas being supported at the outer bottom surface of the frame-like means and at the front face of the bumper.

5. A shock absorber according to claim 4, characterized in that the center portion consists of a steel cable.

6. A shock absorber according to claim 4, characterized in that the plate-shaped end area of the tie-rod means is covered at the front face of the bumper by a rubber bar means.

7. A shock absorber according to claim 4, characterized in that the frame-like means includes a bottom portion for engagement with the end face of the shock absorber opposite the bumper and outwardly extending enclosure portions projecting from said bottom portion in the direction toward the bumper and enclosing the shock absorber at least in part on all sides thereof by said inner area.

8. A shock absorber according to claim 7, characterized in that the frame-like means consists of spring steel.

9. A shock absorber according to claim 8, characterized in that the plate-shaped end area of the tie rod means is covered at the front face of the bumper by a rubber bar means.

10. A shock absorber according to claim 9, characterized in that the fixed vehicle part is a cross bearer.

11. A shock absorber according to claim 1, characterized in that the frame-like means encloses a portion of the shock absorber at its end near the vehicle.

12. In a shock absorber arrangement which comprises hollow elastomeric members being arranged between a vehicle bumper means and a fixed vehicle part, the improvement comprising support means for mounting said elastomeric members and said bumper means to said fixed vehicle part, said support means engaging each of said elastomeric members at an end facing said fixed vehicle part, wherein said support means includes a C-shaped structure receiving each of said elastomeric members with at least two projecting members engaging each elastomeric member at the sides thereof, and wherein each projecting member has outer surface portions engagingly abutting interior surfaces of said bumper means, and wherein first means are provided for securing said support means and elastomeric members to said bumper means, and second means are provided for securing said support means to said fixed vehicle part.

13. A shock absorber arrangement according to claim 12, wherein said first means include a tie-rod member secured to opposite ends to plate-like members, said plate-like members respectively engaging the outer surface of said bumper means and said support means.

14. A shock absorber arrangement according to claim 12, wherein said first means prestresses said elastomeric members.

15. A shock absorber arrangement according to claim 12, wherein said projecting members engage a substantial portion of said elastomeric member.

16. A shock absorber arrangement according to claim 12, wherein said C-shape structure is formed of spring steel.

17. A shock absorber arrangement according to claim 12, wherein said fixed vehicle part includes a cross bearer.

* * * * *